US008331109B2

(12) United States Patent
Appel et al.

(10) Patent No.: US 8,331,109 B2
(45) Date of Patent: Dec. 11, 2012

(54) ASYMMETRIC HALF-BRIDGE WITH REDUCED SWITCH LOAD

(75) Inventors: Wilhelm Appel, Laa a.d. Thaya (AT); Bernhard Eichhorner, Vienna (AT); Wolfgang Peprny, Vienna (AT); Arnold Schönleitner, Purkersdorf (AT)

(73) Assignee: Siemens Aktiengesellschaft, München (DE)

( * ) Notice: Subject to any disclaimer, the term of this patent is extended or adjusted under 35 U.S.C. 154(b) by 665 days.

(21) Appl. No.: 12/519,418

(22) PCT Filed: Sep. 21, 2007

(86) PCT No.: PCT/EP2007/060009
§ 371 (c)(1),
(2), (4) Date: Dec. 15, 2009

(87) PCT Pub. No.: WO2008/074530
PCT Pub. Date: Jun. 26, 2008

(65) Prior Publication Data
US 2010/0102786 A1  Apr. 29, 2010

(30) Foreign Application Priority Data
Dec. 19, 2006 (AT) .................. A 2085/2006

(51) Int. Cl.
H02M 3/335 (2006.01)
(52) U.S. Cl. .................. 363/16; 363/131
(58) Field of Classification Search ............. 363/15, 363/16, 131
See application file for complete search history.

(56) References Cited

U.S. PATENT DOCUMENTS

| 4,280,174 A | * | 7/1981 | Sonda | 363/24 |
| 4,403,269 A | * | 9/1983 | Carroll | 361/91.7 |
| 4,521,671 A | * | 6/1985 | Fronius | 219/130.31 |
| 4,594,649 A | * | 6/1986 | Rhoads et al. | 363/131 |
| 4,736,284 A | * | 4/1988 | Yamagishi et al. | 363/16 |
| 4,754,385 A | * | 6/1988 | McDade et al. | 363/16 |
| 4,768,141 A | * | 8/1988 | Hubertus et al. | 363/16 |
| 4,870,553 A | * | 9/1989 | Brown | 363/16 |

(Continued)

FOREIGN PATENT DOCUMENTS

DE 3133578 A1 3/1983

(Continued)

OTHER PUBLICATIONS

Brown, Marty: "Practical Switching Power Supply Design." Motorola Series in Solid State Electronics. Academic Press, 1990. ISBN 0-12-137030-5. pp. 119-124.

(Continued)

Primary Examiner — Jeffrey Sterrett

(57) ABSTRACT

A circuit arrangement for two serially connected semiconductor switches connected to a voltage supply is provided. Between the semiconductor switches a primary winding of a transformer is connected. A first diode is connected on an anode side to a potential of the voltage supply at a source terminal of the second semiconductor switch and on a cathode side to a first connection terminal facing the first semiconductor switch on the primary winding. A second diode is connected on the cathode side to the potential of the voltage supply at a drain terminal of the first semiconductor switch and on the anode side to a second connection terminal facing the second semiconductor switch on the primary winding. A first secondary winding of the transformer is provided, connected in series between the first diode and the first connection terminal, and a second secondary winding, connected in series between the second diode and the second connection terminal.

2 Claims, 1 Drawing Sheet

U.S. PATENT DOCUMENTS

| | | | | |
|---|---|---|---|---|
| 4,974,142 | A | * | 11/1990 | Leslie .......................... 363/131 |
| 5,047,911 | A | * | 9/1991 | Sperzel et al. ............. 363/56.01 |
| 5,146,396 | A | * | 9/1992 | Eng et al. ........................ 363/16 |
| 5,412,332 | A | * | 5/1995 | Heeringa et al. .............. 327/110 |
| 5,438,501 | A | * | 8/1995 | Margaritis et al. .............. 363/24 |
| 5,786,990 | A | * | 7/1998 | Marrero .......................... 363/16 |
| 6,081,434 | A | * | 6/2000 | Kinoshita et al. ............... 363/24 |
| 6,191,960 | B1 | * | 2/2001 | Fraidlin et al. .................. 363/25 |
| 2005/0152158 | A1 | * | 7/2005 | Gut et al. ........................ 363/16 |

FOREIGN PATENT DOCUMENTS

| | | |
|---|---|---|
| EP | 0539903 A2 | 5/1993 |
| SU | 1203664 A | 7/1986 |

OTHER PUBLICATIONS

Pressman, Abraham I.: "Switching Power Supply Design." $2^{nd}$ Edition: McGraw-Hill, 1998. ISBN 0-07-052236-7. pp. 66-89.

* cited by examiner

ASYMMETRIC HALF-BRIDGE WITH REDUCED SWITCH LOAD

CROSS REFERENCE TO RELATED APPLICATIONS

This application is the US National Stage of International Application No. PCT/EP2007/060009 filed Sep. 21, 2007 and claims the benefit thereof. The International Application claims the benefits of Austrian Patent Application No. A2085/2006 AT filed Dec. 19, 2006, both of the applications are incorporated by reference herein in their entirety.

FIELD OF INVENTION

The invention relates to a circuit arrangement for reducing the load on semiconductor switches in transformer circuits with a primary side and a secondary side, which on the primary side have a first semiconductor switch and a serially-connected second semiconductor switch, with the drain terminal of the first semiconductor switch being connected to a first terminal of a supply voltage and the source terminal of the second semiconductor switch to the second terminal of the supply voltage, and connected between the source terminal of the first semiconductor switch and the drain terminal of the second semiconductor switch is the primary winding of a transformer, of which the secondary winding is connected to a secondary-side load and a first diode is provided which is connected on the anode side to the potential of the supply voltage at the source terminal of the second semiconductor switch and on the cathode side to a first connection terminal on the primary winding of a transformer facing towards the first semiconductor switch, which is connected on the cathode side to the potential of the supply voltage of the drain terminal of the first semiconductor switch and on the anode side to a second connection terminal facing towards the second semiconductor switch to the primary winding of the transformer.

BACKGROUND OF INVENTION

Circuit arrangements of this type are known for example from asymmetrical half-bridge circuits, in which the energy present at the time of the blocking phase of the semiconductor switch in parasitic inductances such as line inductances or stray inductances is fed back via diodes into the corresponding intermediate power circuit. In such cases however the permissible dielectric strength of the semiconductor switch must be greater in each case than the level of the intermediate circuit voltage.

This problem is resolved in the conventional manner by using semiconductor switches with correspondingly high, permissible blocking voltages. However this gives rise to correspondingly higher costs. On the other hand semiconductor switches with correspondingly high blocking voltages are often not available at all or exhibit other disadvantages such as bad gating properties or large component sizes. Thus, in accordance with the prior art a number of switches with high permissible blocking voltages have to be connected in parallel in order to obtain the necessary conductivity properties.

SUMMARY OF INVENTION

An object of the invention is thus to avoid these disadvantages and to implement a circuit arrangement which ensures in a simple and thus cost-effective manner a reduced load of the semiconductor switches.

This object is achieved by a circuit arrangement as claimed in the claims. Provided is a circuit arrangement for reduction of the load of semiconductor switches in transformer circuits with a primary side and a secondary side, which on the primary side have a first semiconductor switch and a serially-connected second semiconductor switch, with the drain terminal of the first semiconductor switch being connected to a first terminal of a supply voltage, and the source terminal of the second semiconductor switch being connected to the second terminal of the supply voltage, and connected between the source terminal of the first semiconductor switch and the drain terminal of the second semiconductor switch is the primary winding of a transformer, of which the secondary winding is connected to a secondary-side load and a first diode is provided which on the anode side is connected to the potential of the supply voltage at the source terminal of the second semiconductor switch, and on the cathode side to a first connection terminal facing towards the first semiconductor switch on the primary winding of the transformer. In accordance with the invention it is proposed here for a first secondary winding of the transformer to be provided which is serially connected between the first diode and the first connection terminal on the primary winding of the transformer, and for a second secondary winding of the transformer to be provided which is connected serially between the second diode and the second connection terminal on the primary winding of the transformer.

The object is further achieved by a switched mode power supply with a circuit arrangement as claimed in the claims.

BRIEF DESCRIPTION OF THE DRAWINGS

The invention will be explained in greater detail below with the aid of the enclosed figures on the basis of an exemplary embodiment. The figures are as follows FIG. 1 a known circuit arrangement in accordance with the prior art, and FIG. 2 a diagram of an inventive circuit arrangement for a switched mode power supply.

DETAILED DESCRIPTION OF INVENTION

Figure 1:
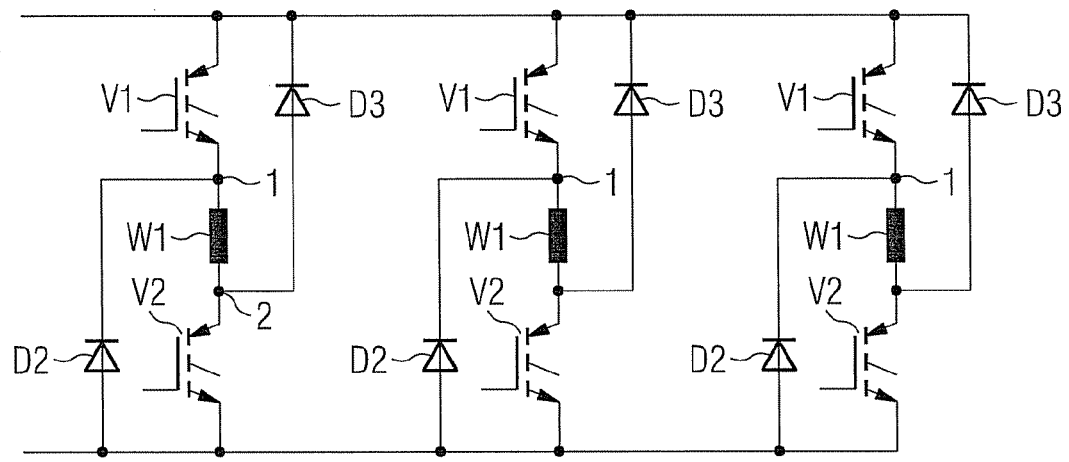

First of all a known circuit arrangement, such as is known from transformer circuits with asymmetrical half-bridge circuits is discussed with reference to FIG. 1. The circuit arrangement consists of a parallel circuit of a number of intermediate circuits which are each formed by two semiconductor switches V1 and V2 as well as two diodes D2 and D3. The first semiconductor switch V1 is connected in series to the second semiconductor switch V2, with the drain terminal of the first semiconductor switch V1 being connected to a supply voltage $V_{in}$ (not shown in FIG. 1) and the source terminal of the second semiconductor switch V2 being at ground potential. Connected between the first semiconductor switch V1 the second semiconductor switch V2 is the primary winding W1 of a transformer T1 (not shown in FIG. 1). Furthermore the first diode D2 is connected on the anode side to ground and on the cathode side to a first connection terminal 1 facing the first semiconductor V1 on the primary winding W1 of the transformer T1. The second Diode D3 is connected on the cathode side to the potential of the supply voltage at the drain terminal of the first semiconductor switch V1, and on the anode side by a second connecting terminal 2 facing the second semiconductor switch V2 on the primary winding W1 of the transformer T1.

The semiconductor switches V1 and V2 are each switched on at the same time. In the conducting phase of the semiconductor switches V1 and V2 the current flows via semiconductor switch V1, the primary winding W1 and semiconductor switch V2 to ground. Both semiconductor switches V1 and V2 are switched off again at the same time. In the blocking phase of semiconductor switches V1 and V2 the inductance in the circuit through which the current flows drives the current onwards, and leads to a voltage increase at the semiconductor switches V1 and V2, until the voltage on the intermediate circuit reaches a diode threshold. In this way the maximum voltage load of the semiconductor switches V1 and V2 is restricted. In the blocking phase of the semiconductor switches V1 and V2 however the permissible dielectric strength of the semiconductor switches V1 and V2 must be greater in each case than the level of the intermediate circuit voltage.

Figure 2:
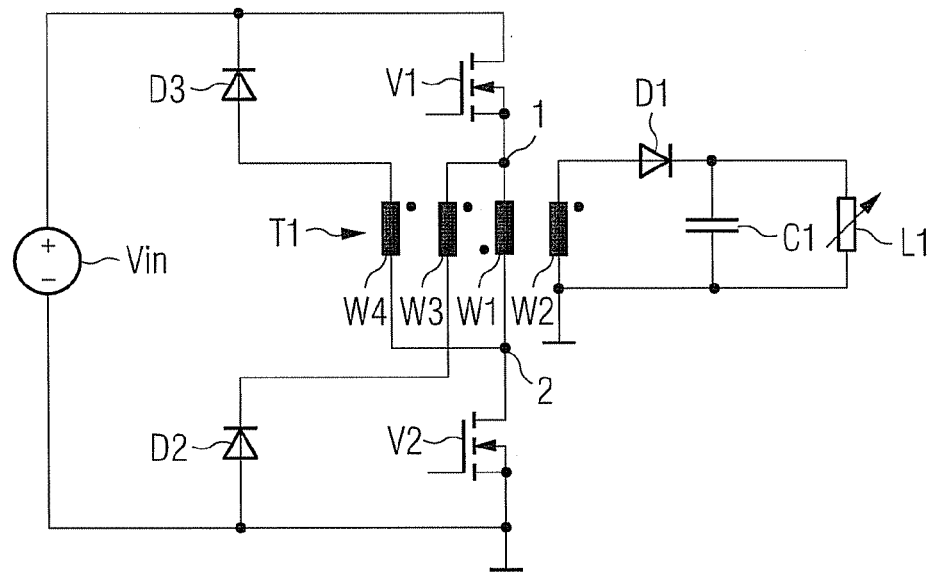

By comparison with this, FIG. 2 shows a possible embodiment of the invention which ensures a reduced load of the semiconductor switches V1 and V2. It shows an asymmetric half-bridge with two serially connected semiconductor switches V1 and V2, with the drain terminal of the first semiconductor switch V1 being connected to a first terminal of a supply voltage $V_{in}$, the source terminal of the second semiconductor switch V2 being connected to the second terminal of the supply voltage $V_{in}$, or to ground. Connected once again between the source terminal of the first semiconductor switch V1 and the drain terminal of the second semiconductor switch V2 is the primary winding W1 of a transformer T1, of which the secondary winding W2 is connected to a secondary-side load L1. A rectifier and smoothing stage can also be provided on the secondary side, such as with the aid of a diode D1 and a capacitor C1.

Furthermore a first diode D2 is provided which is connected on the anode side to the potential of the supply voltage, and on the cathode side is connected by a first connection terminal 1 facing the first semiconductor switch V1 to the primary winding W1 of the transformer T1. A second diode D3 is connected on the cathode side to the potential of the supply voltage at the drain terminal of the first semiconductor switch V1, and on the anode side by a second connection terminal 2 facing towards the second semiconductor switch V2 to the primary winding W1 of the transformer T1.

Inventively a first secondary winding W3 of the transformer T1 is now provided which is serially connected between the first diode D2 and a first connection terminal 1 to the primary winding W1 of the transformer T1. Furthermore a second secondary winding W4 of the transformer T1 is provided which is connected serially between the second diode D3 and the second connection terminal 2 to the primary winding W1 of the transformer T1.

The semiconductor switches V1 and V2 once again switch (almost) simultaneously. During the switch-on phase of the semiconductor switches V1 and V2 the passage of current through the circuit consisting of semiconductor switch V1, primary winding W1 and semiconductor switch V2 is as in the known prior art. The current increases in accordance with the available driving voltage and the impedance of the transformer T1. At the moment that the semiconductor switches V1 and V2 are switched off the inductance in the said circuit which is not decoupled from the secondary winding W2 of transformer T1 drives the current onwards and leads to a rapid voltage increase at the primary winding W1. The secondary windings W3 and W4 of transformer T1 are wound well coupled with the primary winding W1. Consequently the voltage also increases at the secondary winding W3 and the secondary winding W4, by comparison with the respective transformation figures.

As soon as the sum of the voltages at the secondary winding W1, the secondary winding W2 and the secondary winding W3, reduced by V2 diode thresholds of the diodes D2 and D3 now reaches the level of the intermediate circuit voltage, the diodes D2 and D3 become conductive. The further increase in voltage is restricted by this. At this moment the level of the load on the semiconductor switch V1 corresponds to the sum of the intermediate circuit voltage and the diode threshold of the diode D2, minus the instantaneous voltage at the secondary winding W3.

The series connection of a secondary winding W3 and W4 respectively to the diodes D2 and D3 enables the maximum voltage load on the semiconductor switches V1 and V2 to be reduced. This enables components with lower dielectric strength to be used. Such components are naturally cheaper or have other relevant advantages such as lower conducting resistances or smaller form factors.

The invention claimed is:

1. A circuit arrangement for reducing the load of semiconductor switches in transformer circuits with a primary side and a secondary side, comprising:
   a first semiconductor switch on the primary side;
   a second semiconductor switch on the primary side serially connected to the first semiconductor switch;
   a first terminal of a supply voltage, a drain terminal of the first semiconductor switch being connected to the first terminal;
   a second terminal of the supply voltage, a source terminal of the second semiconductor switch being connected to the second terminal;
   a primary winding of a transformer being connected between a source terminal of the first semiconductor switch and a drain terminal of the second semiconductor switch;
   a secondary winding of the transformer being connected to a secondary-side load;
   a first diode connected on an anode side to a potential of the supply voltage at the source terminal of the second semiconductor switch and on a cathode side by a first connection terminal between the first semiconductor switch and the primary winding of the transformer;
   a second diode connected on a cathode side to the potential of the supply voltage at the drain terminal of the first semiconductor switch and on an anode side to a second connection terminal between the second semiconductor switch and the primary winding of the transformer;
   a first auxiliary winding of the transformer having a sense of winding which is in the opposite direction compared to a sense of winding of the primary winding of the transformer, the first auxiliary winding being connected serially between the first diode and the first connection terminal on the primary winding of the transformer; and
   a second auxiliary winding of the transformer having a sense of winding which is in the opposite direction compared to the sense of winding of the primary winding of the transformer, the second auxiliary winding connected serially between the second diode and the second connection terminal on the primary winding of the transformer.

2. A switched-mode power supply, comprising:
   a circuit arrangement for reducing the load of semiconductor switches in transformer circuits with a primary side and a secondary side, comprising:
   a first semiconductor switch on the primary side;
   a second semiconductor switch on the primary side serially connected to the first semiconductor switch;

a first terminal of a supply voltage, a drain terminal of the first semiconductor switch being connected to the first terminal;

a second terminal of the supply voltage, a source terminal of the second semiconductor switch being connected to the second terminal;

a primary winding of a transformer being connected between a source terminal of the first semiconductor switch and a drain terminal of the second semiconductor switch;

a secondary winding of the transformer being connected to a secondary-side load;

a first diode connected on an anode side to a potential of the supply voltage at the source terminal of the second semiconductor switch and on a cathode side by a first connection terminal between the first semiconductor switch and the primary winding of the transformer;

a second diode connected on a cathode side to the potential of the supply voltage at the drain terminal of the first semiconductor switch and on an anode side to a second connection terminal between the second semiconductor switch and the primary winding of the transformer;

a first auxiliary winding of the transformer having a sense of winding which is in the opposite direction compared to a sense of winding of the primary winding of the transformer, the first auxiliary winding being connected serially between the first diode and the first connection terminal on the primary winding of the transformer; and a second auxiliary winding of the transformer having a sense of winding which is in the opposite direction compared to the sense of winding of the primary winding of the transformer, the second auxiliary winding connected serially between the second diode and the second connection terminal on the primary winding of the transformer.

* * * * *